United States Patent
Anderson et al.

(10) Patent No.: US 8,511,740 B2
(45) Date of Patent: Aug. 20, 2013

(54) VEHICLE DOOR REINFORCEMENT

(75) Inventors: Erik Anderson, Plymouth, MI (US); Jonathan Patty, Novi, MI (US); David Kovie, Livonia, MI (US); Charles Cutting, Taylor, MI (US)

(73) Assignee: Nissan North America, Inc., Franklin, TN (US)

( * ) Notice: Subject to any disclaimer, the term of this patent is extended or adjusted under 35 U.S.C. 154(b) by 0 days.

(21) Appl. No.: 13/044,349

(22) Filed: Mar. 9, 2011

(65) Prior Publication Data

US 2012/0228897 A1    Sep. 13, 2012

(51) Int. Cl.
B60J 5/06    (2006.01)

(52) U.S. Cl.
USPC ..................................... 296/146.6

(58) Field of Classification Search
USPC ................. 296/155, 146.6, 187.12, 187.03, 296/146.08, 146.9; 49/502
See application file for complete search history.

(56) References Cited

U.S. PATENT DOCUMENTS

| | | | |
|---|---|---|---|
| 4,615,558 A | | 10/1986 | Nakamura et al. |
| 4,796,946 A | * | 1/1989 | Wilson et al. ............... 296/146.6 |
| 4,969,295 A | * | 11/1990 | Nishikawa et al. ............. 49/502 |
| 5,364,157 A | | 11/1994 | Siedlecki |
| 5,553,910 A | * | 9/1996 | Park .......................... 296/187.12 |
| 5,573,297 A | * | 11/1996 | DeRees et al. ............... 296/146.6 |
| 6,039,387 A | * | 3/2000 | Choi ........................ 296/187.12 |
| 6,119,407 A | * | 9/2000 | Staser et al. ..................... 49/502 |
| 6,779,829 B2 | * | 8/2004 | Chappuis et al. ........... 296/146.5 |
| 7,401,847 B2 | * | 7/2008 | Kidachi et al. ............ 296/187.12 |
| 7,607,716 B2 | * | 10/2009 | Buchta et al. ............... 296/146.6 |
| 7,677,640 B2 | * | 3/2010 | Dix et al. .................... 296/146.7 |
| 8,029,043 B2 | * | 10/2011 | Baumann .................. 296/187.12 |
| 2006/0049667 A1 | | 3/2006 | Suzuki |
| 2009/0184501 A1 | | 7/2009 | Hirotani |

FOREIGN PATENT DOCUMENTS

| | | |
|---|---|---|
| EP | 06 59601 A1 | 6/1995 |
| EP | 2082909 A1 | 7/2009 |
| JP | 59014579 A | 1/1984 |
| JP | 06-001145 A | 1/1994 |
| JP | 11-321317 A | 11/1999 |
| JP | 2003-182366 A | 7/2003 |
| JP | 2006-076321 A | 3/2006 |
| JP | 2008-062795 A | 3/2008 |
| JP | 2008-094344 A | 4/2008 |
| WO | WO-01/23200 A1 | 4/2001 |

\* cited by examiner

*Primary Examiner* — Glenn Dayoan
*Assistant Examiner* — Pinel Romain
(74) *Attorney, Agent, or Firm* — Global IP Counselors, LLP (57) ABSTRACT

A vehicle door comprises an outer door panel, and inner door panel, and a reinforcement member. The outer door panel includes a pair of vertically extending free ends and a pair of horizontally extending free ends forming a peripheral edge portion. The inner door panel is rigidly attached to the peripheral edge portion of the outer door panel such that an internal door cavity is defined between the outer and inner door panels. The reinforcement member is disposed in the internal door cavity. The reinforcement member includes a first attachment portion rigidly attached to an inner surface of the outer door panel at a first location adjacent the peripheral edge portion of the outer door panel, and a second attachment portion rigidly attached to an inner surface of the inner door panel at a second location.

27 Claims, 11 Drawing Sheets

VEHICLE DOOR REINFORCEMENT

BACKGROUND

1. Field of the Invention

The present invention generally relates to a vehicle door reinforcement. More specifically, the present invention relates to a vehicle door reinforcement that is configured to reduce the effect of shear force in the outer door panel that is generated during movement of the vehicle door between open and closed positions.

2. Background Information

Certain vehicles such as passenger vans, cargo vans and the like often include a sliding vehicle door located on a side of the vehicle. A sliding vehicle door typically slides backward toward the rear of the vehicle to an open position to allow access to the passenger compartment of the vehicle, and forward toward the front of the vehicle to a closed position. Also, a sliding vehicle door usually includes outer and inner door panels. The outer and inner door panels are typically made of sheet metal or other suitable material, and are coupled together by, for example, welding or other types of fasteners such as screws, bolts, rivets and so on. Often, the front edge of the outer door panel is bent about a parting radius toward the inner door panel, and then bent forward about another radius to form a hem flange where the outer and inner door panels are mated together by welding or any other suitable type of fasteners. The parting edge radius is usually small, for example, at or about 2.0 mm to improve fit and finish of the outer door panel with the vehicle body structure when the sliding vehicle door is in the closed position.

As a sliding vehicle door is slid from the open position toward the closed position and slammed closed, a shear force or stress is generated in the outer door panel. The parting edge radius thus bears inertial loads of the outer door panel during a slam close operation. For instance, the shear force or stress in the outer door panel also generates a bending moment about the parting radius due to the step-shaped configuration of the front edge of the outer door panel. As a result of this bending moment, fatigue cracks can form in the outer door panel near the hem flange or near a location at which an outer door handle is typically installed on the outer door panel.

In order to maintain an acceptable outside appearance, welding or other rigid attachment methods are generally not used on portions of the outer door panel that are visible from outside the vehicle. Welding is also not used on the inner surface of such portions of the outer door panel, since the welded areas even on the inner surface can still diminish the appearance of the outer surface of the outer door panel. Hence, to reinforce the outer door panel, a stiffener can be attached to the inner surface of the outer door panel by a low stiffness adhesive such as a mastic adhesive. Also, bake-on composite layer stiffeners can be applied to the hidden inner surfaces of the outer door panel. However, the stiffeners attached with mastic adhesive or with bake-on composite generally do not reduce the stress that occurs at the parting radius as discussed above. For example, bake-on stiffeners of a sufficient thickness typically cannot conform around a small dimension radius, such as the parting radius, to provide adequate reinforcement. Also, mastic adhesive typically does not provide a rigid enough connection to transfer the load away from the parting radius.

SUMMARY

In view of the state of the known technology, one aspect of the present invention is to provide a vehicle door comprising an outer door panel, and inner door panel, and a reinforcement member. The outer door panel includes a pair of vertically extending free ends and a pair of horizontally extending free ends forming a peripheral edge portion. The inner door panel is rigidly attached to the peripheral edge portion of the outer door panel such that an internal door cavity is defined between the outer and inner door panels. The reinforcement member is disposed in the internal door cavity. The reinforcement member includes a first attachment portion rigidly attached to an inner surface of the outer door panel at a first location adjacent the peripheral edge portion of the outer door panel, and a second attachment portion rigidly attached to an inner surface of the inner door panel at a second location.

BRIEF DESCRIPTION OF THE DRAWINGS

Referring now to the attached drawings which form a part of this original disclosure.

DETAILED DESCRIPTION OF EMBODIMENTS

Selected embodiments will now be explained with reference to the drawings. It will be apparent to those skilled in the art from this disclosure that the following descriptions of the embodiments are provided for illustration only and not for the purpose of limiting the invention as defined by the appended claims and their equivalents.

Figure 1:
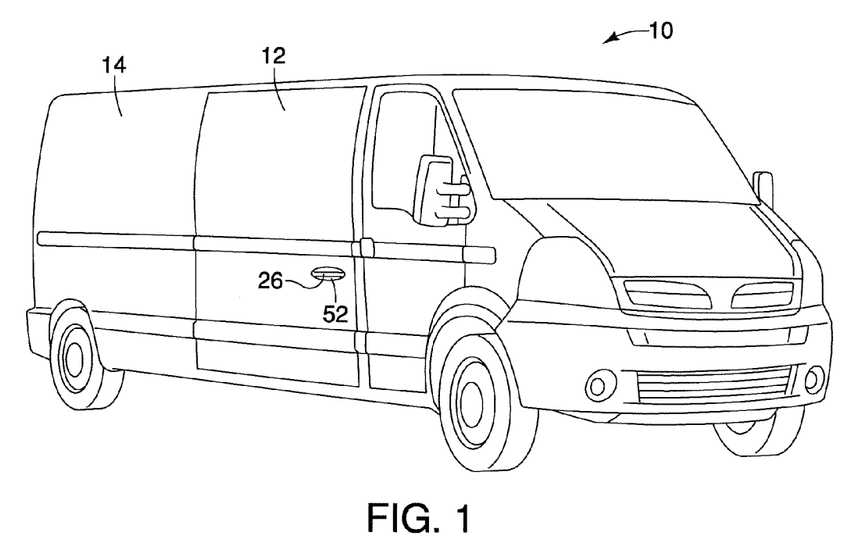
FIG. 1 is a front perspective view of a vehicle having a vehicle body structure with a sliding vehicle door in accordance with one illustrated embodiment.
Figure 2:
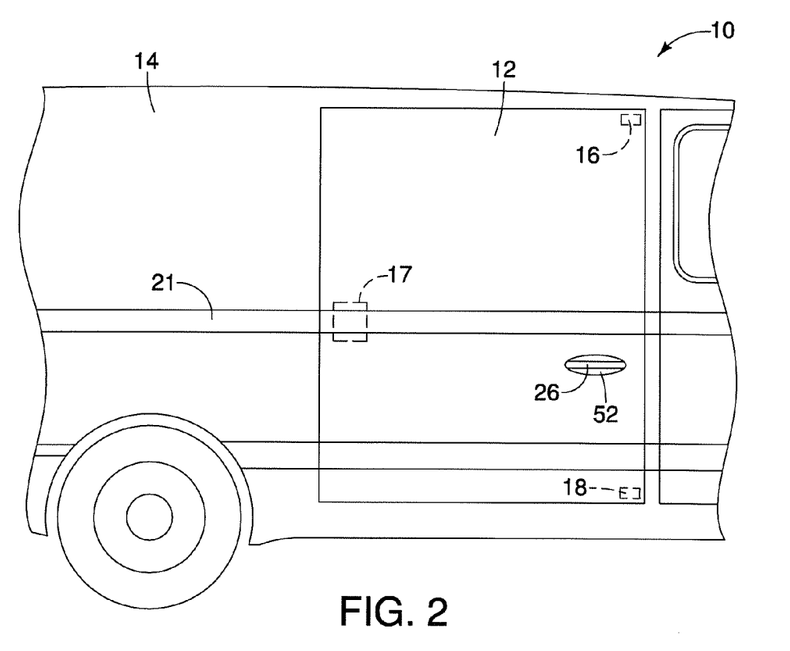
FIG. 2 is a side elevational view of the vehicle illustrated in FIG. 1 with the sliding vehicle door in a closed position.
Figure 3:
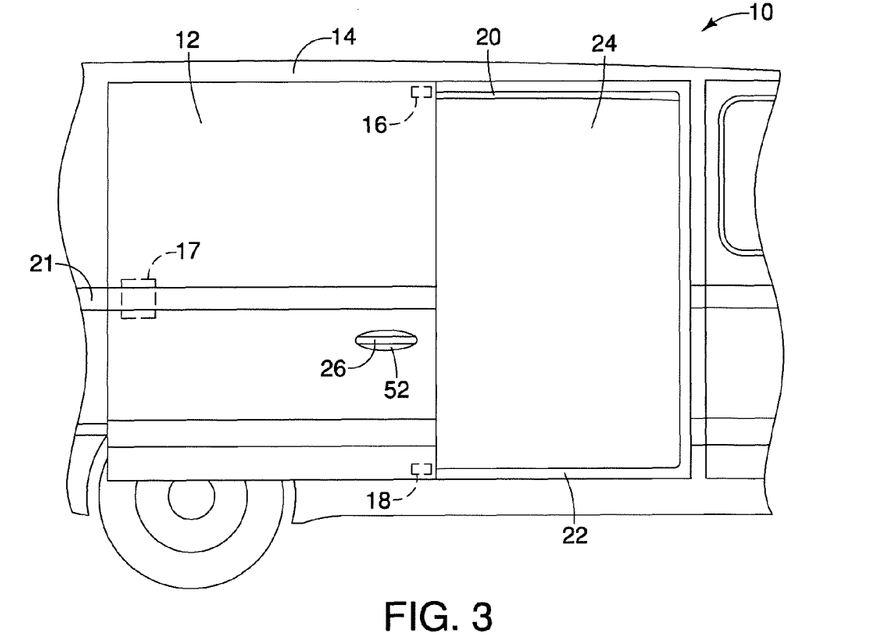
FIG. 3 is a side elevational view of the vehicle illustrated in FIG. 1 with the sliding vehicle door in an open position.

Referring initially to FIGS. 1-3, a vehicle 10 having a vehicle door 12 and a vehicle body structure 14 is illustrated in accordance with a disclosed embodiment. As discussed in more detail below, components of the vehicle door 12 and the vehicle body structure 14 can be made from sheet metal or any other suitable material that is typically used in vehicles. In this example, the vehicle door 12 is a sliding vehicle door that is slidably mounted to the vehicle body structure 14.

Figure 4:
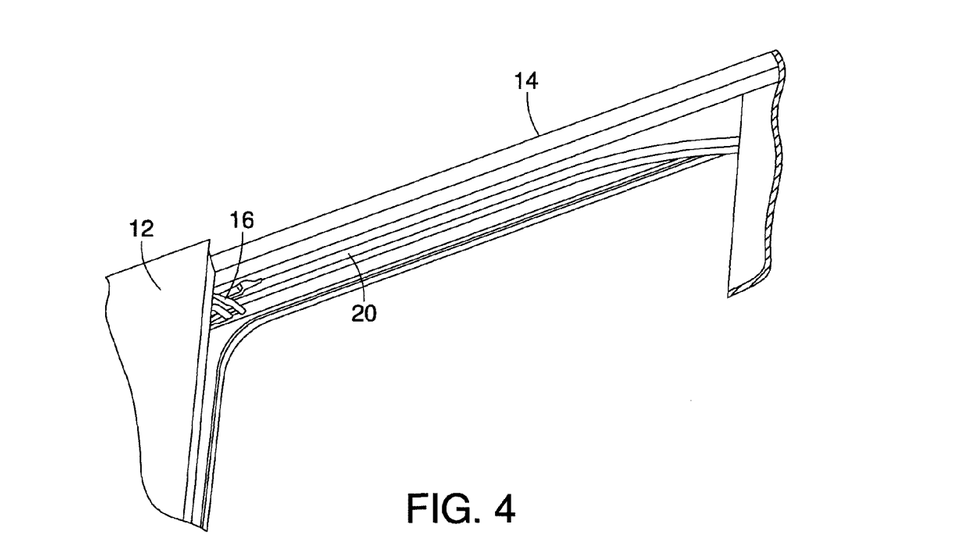
FIG. 4 is a detailed perspective view of the top of the vehicle door opening in the vehicle body structure with the sliding vehicle door in the open position as shown in FIG. 3.

That is, as shown in FIGS. 3 and 4, the vehicle door 12 includes an upper sliding door support 16, a rear sliding door support 17, and a lower sliding door support 18. The upper sliding door support 16 is slidably mounted to an upper rail structure 20, the rear sliding door support 17 is slidably mounted to a rear rail structure 21, and the lower mounting structure 18 is slidably mounted to a lower rail structure 22. As understood in the art, the upper, rear, and lower sliding door supports 16,17, and 18, and the upper, rear, and lower rail structures 20, 21 and 22, are made of metal or any other suitable material having sufficient strength and durability to support the vehicle door 12. Accordingly, the vehicle door 12 can be slid along the upper, rear, and lower rail structures 20, 21, and 22 between a closed position as shown in FIG. 2 to an open position as shown in FIG. 3. In the open position, the vehicle door 12 permits access to the interior of the vehicle 10 through a vehicle door opening 24. In addition, the vehicle door 12 includes a door handle 26 that can be used to unlatch the vehicle door 12 from a latching member (not shown) that maintains the vehicle door 12 in the closed position as understood in the art.

Figure 5:
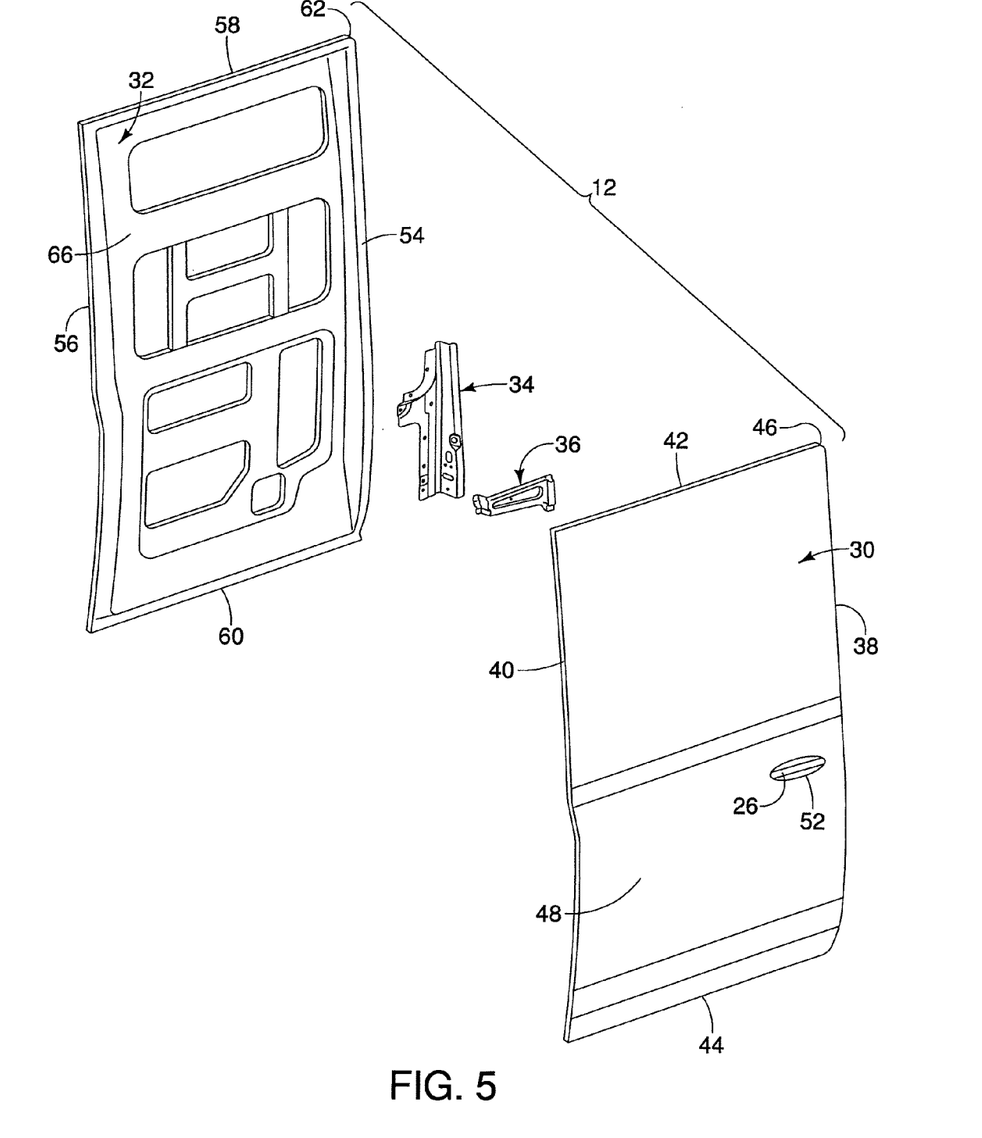
FIG. 5 is an exploded perspective view of the sliding vehicle door illustrating an inner vehicle door panel, an inner door reinforcement component, a reinforcement member and an outer vehicle door panel.

As shown in FIG. 5, the vehicle door 12 includes an outer door panel 30, an inner door panel 32, an inner door reinforcement component 34 and a reinforcement member 36. The outer door panel 30, the inner door panel 32, the inner door reinforcement component 34 and the reinforcement member 36 each can be made of sheet metal or any other suitable material having sufficient strength and durability. The outer door panel 30 includes a pair of vertically extending free ends 38 and 40, and a pair of horizontally extending free ends 42 and 44. The pair of vertically extending free ends 38 and 40, and the pair of horizontally extending free ends 42 and 44 form a peripheral edge portion 46. Also, the outer door panel 30 includes an outer surface 48 and an inner surface 50 (see FIGS. 16-18). The outer surface 48 of the outer door panel 30 defines a door handle receiving portion 52 in which the door handle 26 is at least partially disposed.

The inner door panel 32 includes a pair of vertically extending free ends 54 and 56, and a pair of horizontally extending free ends 58 and 60. The pair of vertically extending free ends 54 and 56, and the pair of horizontally extending free ends 58 and 60 form a peripheral edge portion 62. Also, the inner door panel 32 includes an outer surface 64 (see FIGS. 16-18) and an inner surface 66. As discussed in more detail below, the inner door panel 32 is rigidly attached to the peripheral edge portion 46 of the outer door panel 30 by hem joint adhesive or other types of joining. In this arrangement, an internal door cavity 68 (see FIGS. 16-18) is defined between the outer and inner door panels 30 and 32. Accordingly, the inner door reinforcement component 34 and the reinforcement member 36 are disposed at least partially within the internal door cavity 68. Furthermore, the upper and lower sliding door supports 16 and 18 are configured to be slidably coupled to the vehicle 10 as discussed above such that the outer and inner door panels 30 and 32 move in unison between the closed position (FIG. 2) and the open position (FIG. 3).

Figure 6:
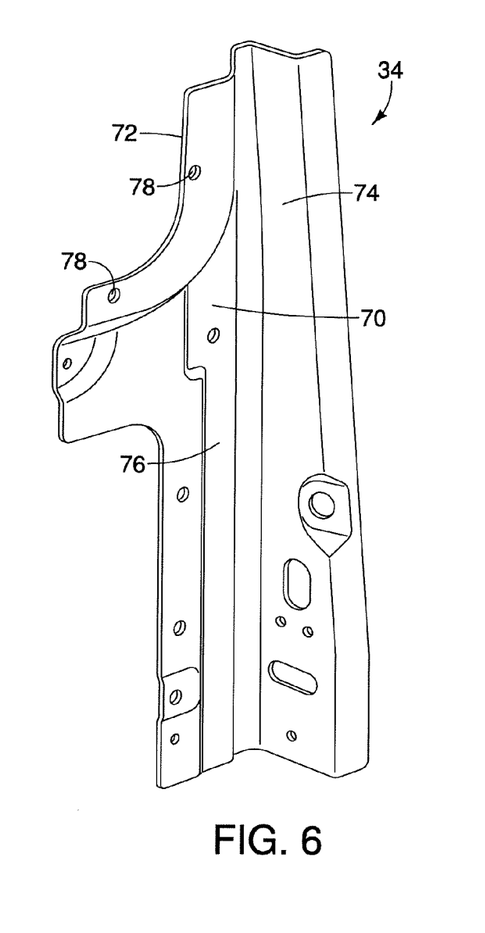
FIG. 6 is a perspective view of the inner door reinforcement component shown in FIG. 5.
Figure 7:
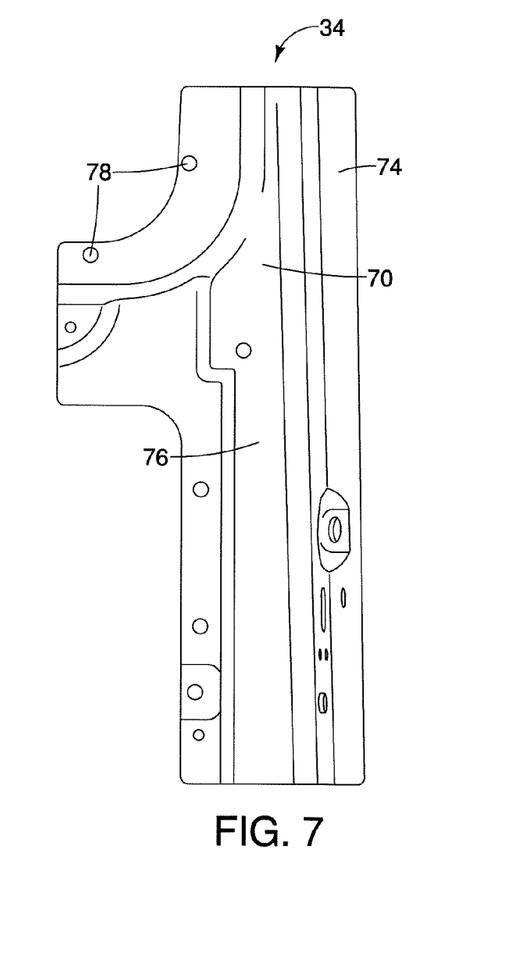
FIG. 7 is a side elevational view of the inner door reinforcement component.
Figure 8:
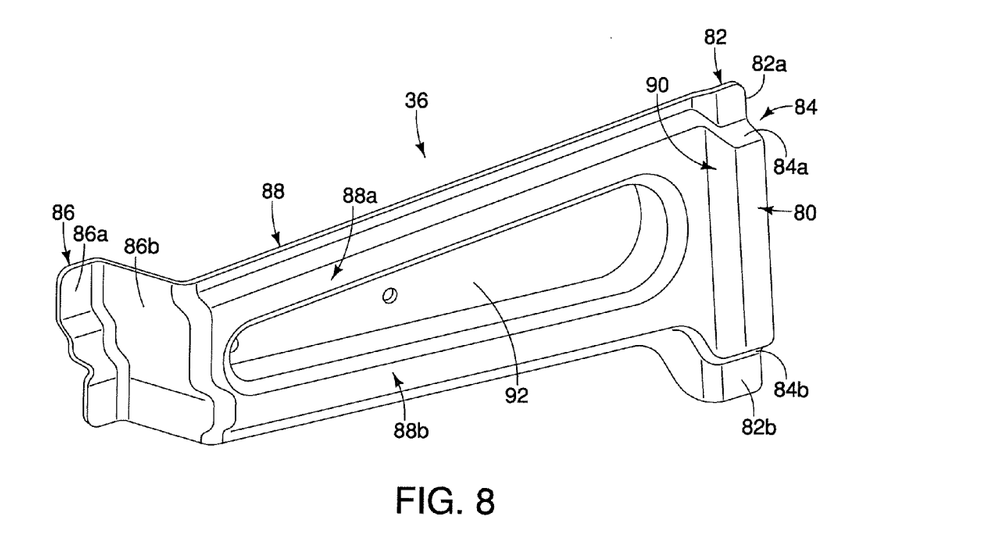
FIG. 8 is a perspective view of the reinforcement member shown in FIG. 5.
Figure 9:
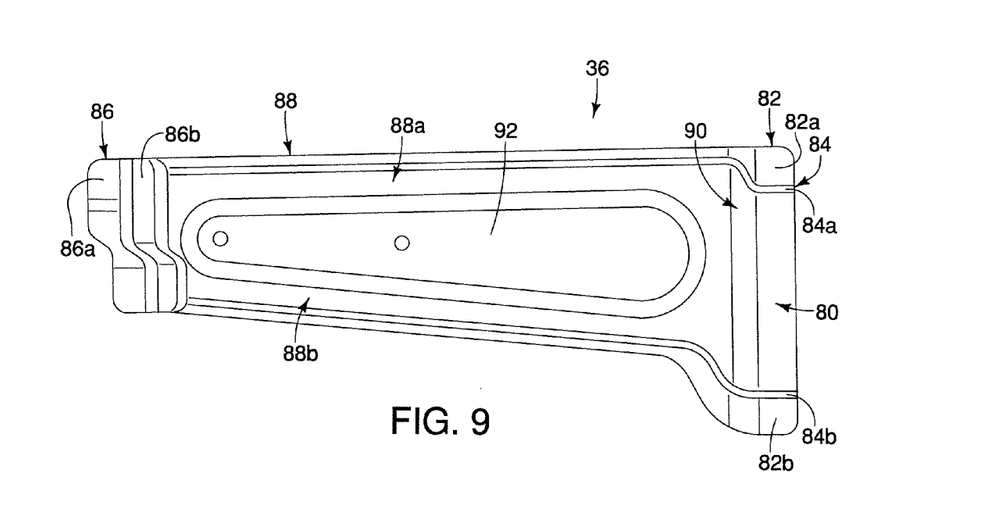
FIG. 9 is a side elevational view of the reinforcement member.
Figure 10:
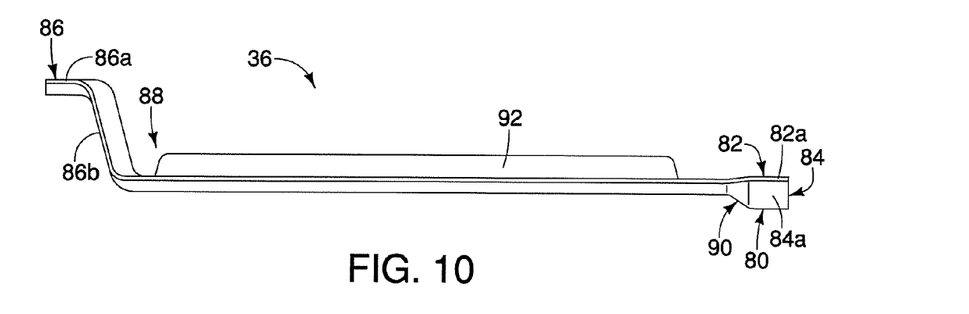
FIG. 10 is a top plan view of the reinforcement member.
Figure 11:
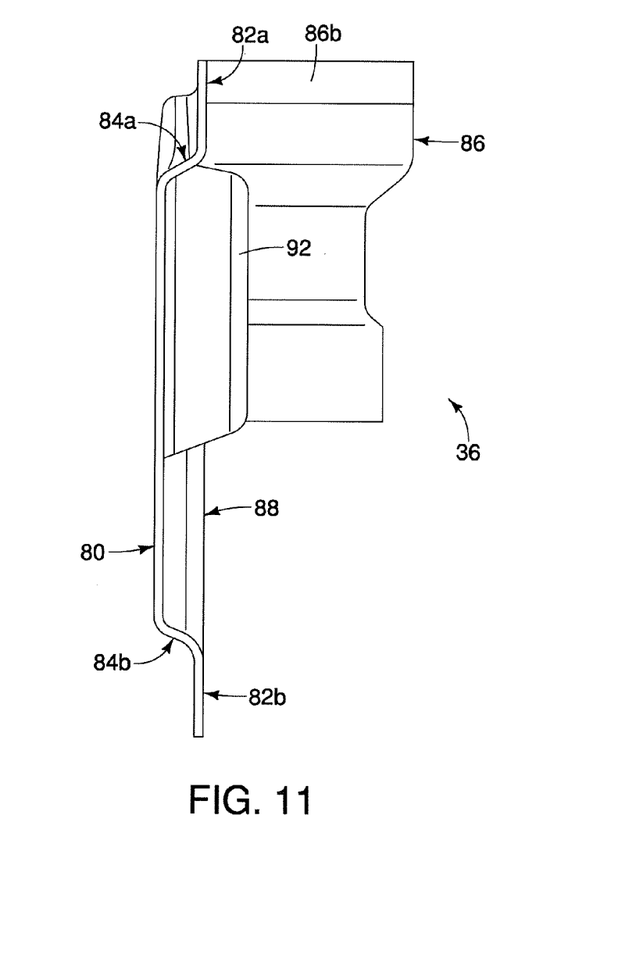
FIG. 11 is a front elevational view of the reinforcement member.

As shown in more detail in FIGS. 6 and 7, the inner door reinforcement component 34 includes an inner surface 70 and an outer surface 72. Furthermore, the inner door reinforcement component 34 is configured to include a first vertical extending portion 74 and a second vertical extending portion 76. The first and second vertical extending portions 74 and 76 extend normal or at least transverse to each other as shown. In addition, the inner door reinforcement component 34 defines a plurality of openings 78 that can receive fasteners or serve other functions for locating or mounting parts.

As shown in FIGS. 8-11, the reinforcement member 36 includes a first attachment portion 80 and a second attachment portion 82. The reinforcement member 36 further includes an extension portion 84 that extends between the first and second attachment portions 80 and 82. The first and second attachment portions 80 and 82 extend transverse to the extension portion 84. Also, the first and second attachment portions 80 and 82 extend parallel or substantially parallel to each other.

In this example, the second attachment portion 82 includes first and second attachment sections 82a and 82b that are located at opposite ends of the first attachment portion 80 as indicated. Accordingly, the extension portion 84 of the reinforcement member 36 includes a first extension portion 84a that couples the first attachment section 82a to the first attachment portion 80, and a second extension portion 84b that couples the second attachment section 82b to the first attachment portion 80.

The reinforcement member 36 further includes a third attachment portion 86 and a stiffener portion 88 that extends from the third attachment portion 86 toward the first attachment portion 80. The reinforcement member 36 also includes a third extension portion 90 that couples the stiffener portion 88 and the first attachment portion 80 together. The stiffener portion 88 in this example further includes a recessed portion 92. The recessed portion 92 acts as a stiffening bead to provide stiffness to the stiffener portion 88. Additionally, the stiffener portion includes mating surfaces 88a and 88b for non-rigid attachment to the inner surface 50 of the outer panel as described herein. As illustrated in this example, the third attachment portion 86 includes an attachment section 86a and an extension section 86b. The attachment section 86a extends parallel or substantially parallel to the stiffener portion 88. The extension section 86b extends transverse to the attachment section 86a and the stiffener portion 88 and couples the attachment section 86a to the stiffener portion 88.

Furthermore, the reinforcement member 36 is shown in this example as a single stamped metal unitary part with all of the components of the reinforcement member 36 discussed above being formed integral with each other. However, the components of the reinforcement member 36 discussed above can be formed separately and coupled together by welds or other fasteners such as bolts, screws, rivets, adhesives or any suitable type of fastening members.

Figure 12:
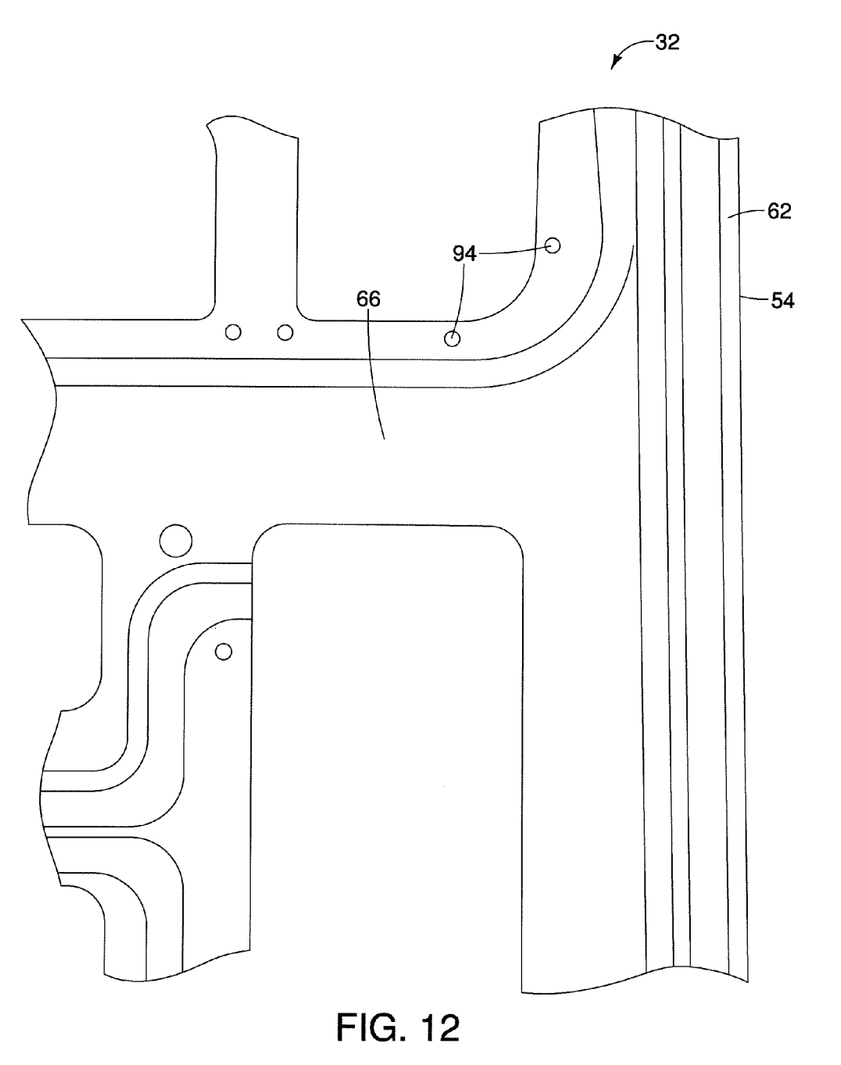
FIG. 12 is a detailed side elevational view of the inner vehicle door panel shown in FIG. 5.
Figure 13:
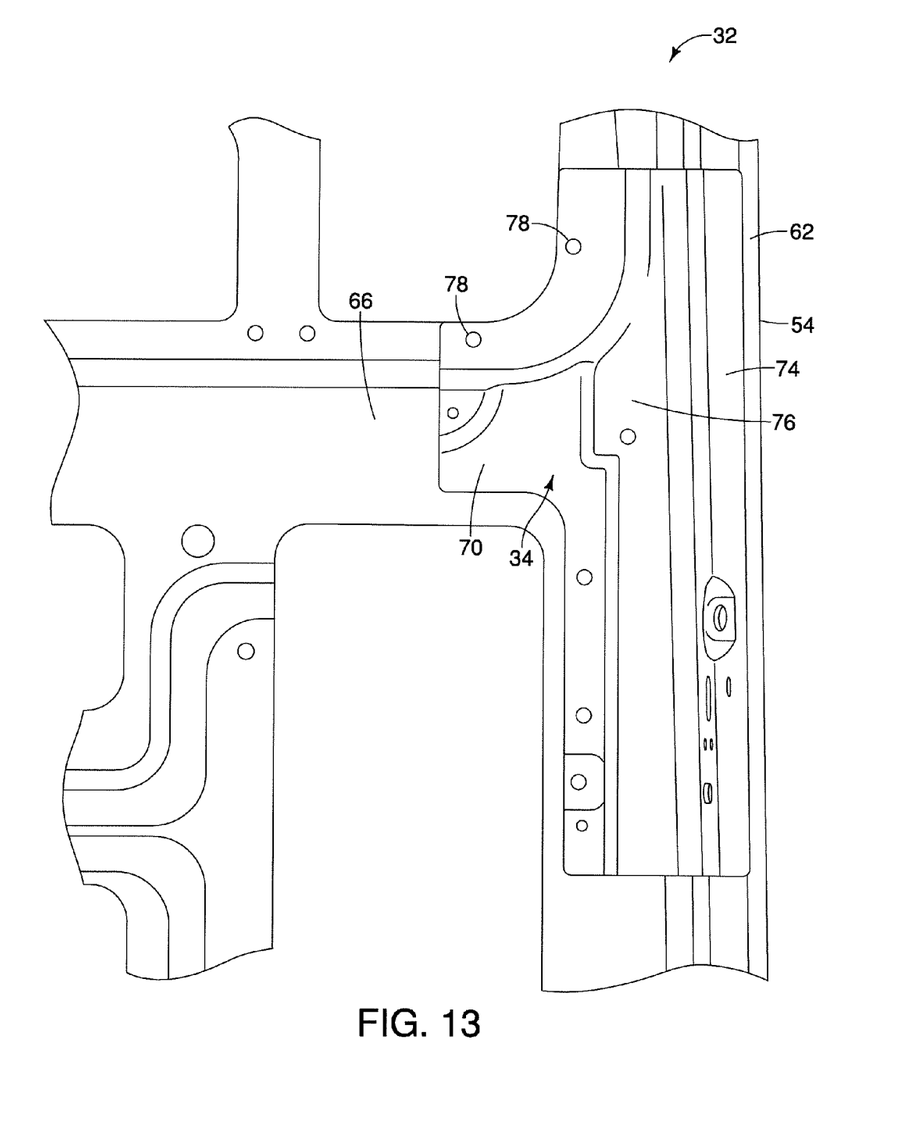
FIG. 13 is a detailed side elevational view of the inner door reinforcement component mounted to the inner vehicle door panel.

Further details of the manner in which the outer door panel 30, the inner door panel 32, the inner door reinforcement component 34 and the reinforcement member 36 are attached in this example to make up the vehicle door 12 will now be discussed. As shown in FIGS. 12 and 13, inner door reinforcement component 34 is mounted to the inner surface 66 of the inner door panel 32. In doing so, fasteners can be inserted in openings 78 defined by the inner door reinforcement component 34 and openings 94 defined by the inner door panel 32 to secure components, such as trim components, to the inner door panel 32, or make other structural connections to the inner door panel 32 and inner door reinforcement component 34. The inner door reinforcement component 34 can still further be secured to the inner door panel 32 by welds, adhesives and so on. When the inner door reinforcement component 34 is attached to the inner door panel 32, the inner surface 70 of the inner door reinforcement component 34 can be considered part of the inner surface 66 of the inner door panel 32 and thus also referred to herein as the inner surface 66.

As shown in FIGS. 14-18, the first attachment portion 80 of the reinforcement member 36 is rigidly attached to the inner surface 50 of the outer door panel 30 at a first location 98 adjacent the peripheral edge portion 46 of the outer door panel 30. Also, the second attachment portion 82 of the reinforcement member 36 is rigidly attached to the inner surface 66 of the inner door panel 32 at a second location 100. The second location 100 is proximate to the peripheral edge portion 46. In this configuration, the first attachment portion 80 extends substantially parallel to the inner surface 50 of the outer door panel 30. Similarly, the second attachment portion 82 extends substantially parallel to the inner surface 66 of the inner door panel 32.

The first attachment portion 80 of the reinforcement member 36 is attached to the inner surface 50 of the outer door panel 30 by non-welded structural adhesive 102. This non-welded structural adhesive 102 provides a rigid connection between the first attachment portion 80 and the inner surface 50. The non-welded structural adhesive 102 can include a bake out or bake-on adhesive tape or any other suitable type of adhesive as known in the art that can provide a suitable rigid connection.

As further shown, the reinforcement member 36 in this example is disposed to extend along the peripheral edge portion 46 of the outer door panel 30. Hence, the first attachment portion 80 extends along a section of the peripheral edge portion 46 defined by one of the vertically extending free edges 38 of the outer door panel 30. More specifically, the first attachment portion 80 can be positioned horizontally along the outer door panel 30 between the peripheral edge portion 46 and the door handle receiving portion 52.

The second attachment portion 82 of the reinforcement member 36 is attached to the inner surface 66 of the inner door panel 32 by, for example, at least one weld 104. The second attachment portion 82 in this example is attached to the inner surface 70 of the inner door reinforcement component 34 which is considered part of the inner surface 66 of the inner door panel 32 as discussed above. However, the second attachment portion 82 can be attached via, for example, at least one weld 104 to a portion of the inner surface 66 of the inner door panel 32 that is not covered by the inner door reinforcement component 34. Moreover, the first and second attachment sections 82a and 82b are located at opposite ends of the first attachment portion 80 with respect to an adjacent section (e.g., the first location 98) of the peripheral edge portion 46 of the outer door panel 30. Accordingly, the first and second extension portions 84a and 84b extend in a direction between the inner surface 50 of the outer door panel 30 and the inner surface 66 of the inner door panel 32.

As understood by one skilled in the art, the reinforcement member 36 is thus configured to provide a load transfer path that can transfer shear loads from the outer door panel 30 to the inner panel 32 during movement of the vehicle door 12 between the closed and open positions as shown in FIGS. 2 and 3, respectively. Specifically, the reinforcement member 36 is configured between the inner and outer door panels 30 and 32 to provide the load transfer path in a direction P (see FIGS. 17 and 18) that is substantially perpendicular to a direction S of the shear force along which the shear load is generated in the outer door panel 30 during movement of the vehicle door 12 to the closed position.

Figures 17, 18:
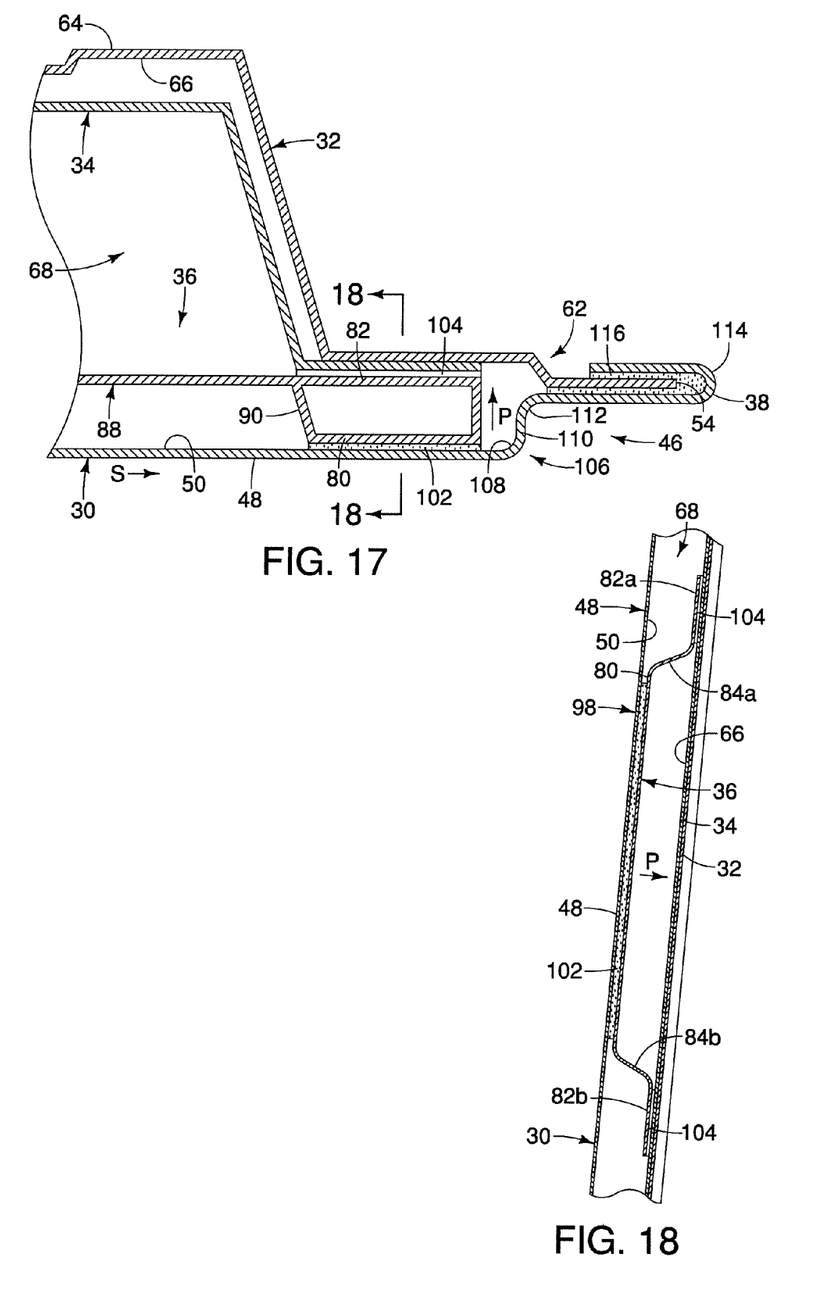
FIG. 17 is a detailed cross-sectional view of the front portion of the reinforcement member mounted to the inner door reinforcement component and the outer vehicle door panel as shown in FIG. 16.
FIG. 18 is a cross-sectional view of the front portion of the reinforcement member mounted to the inner door reinforcement component and the outer vehicle door panel as taken along lines 18-18 in FIG. 17.

Furthermore, the transfer of the shear force reduces the force or stress imposed on a parting radius of the outer door panel 30. That is, as shown in FIG. 17, the peripheral edge portion 46 of the outer door panel 30 includes a curved section 106 that curves along a parting radius 108. The parting radius 108 is generally small, for example, at or about 2.0 mm, or any other suitable value. The first location 98 at which the first attachment portion 80 of the reinforcement member 36 is rigidly attached is adjacent to the curved section 106. Due to potential read-through of the bake out adhesive described above, which causes distortion of the outer panel 30, it is advantageous for the first location 98 to be as near as possible to the parting radius 108 due to the stiffer boundary condition provided by the parting radius 108 and the hem joint formed at the free ends 38 and 54 of the outer panel 30 and inner panel 32, as explained herein. That is, the stiffness of the outer panel 30 increases as it nears the parting radius 108, and the risk of distortion of the outer panel 30 can be decreased as the stiffness of the outer panel increases.

The peripheral edge portion 46 further includes a step leg 110 that extends from the curved section 106 toward the inner surface 66 of the inner door panel 32. The peripheral edge portion 46 is then bent forward about another radius 112 to form a hem flange 114. At the hem flange 114, the outer and inner door panels 30 and 32 are mated together by hem joint adhesive 116 or any other suitable type of joining as understood in the art. Accordingly, the reinforcement member 36 is configured between the outer and inner door panels 30 and 32 in an arrangement that provides the load transfer path from the outer door panel 30 toward the inner door panel 32 in a direction P that is parallel or substantially parallel to the step leg 110.

Figure 14:
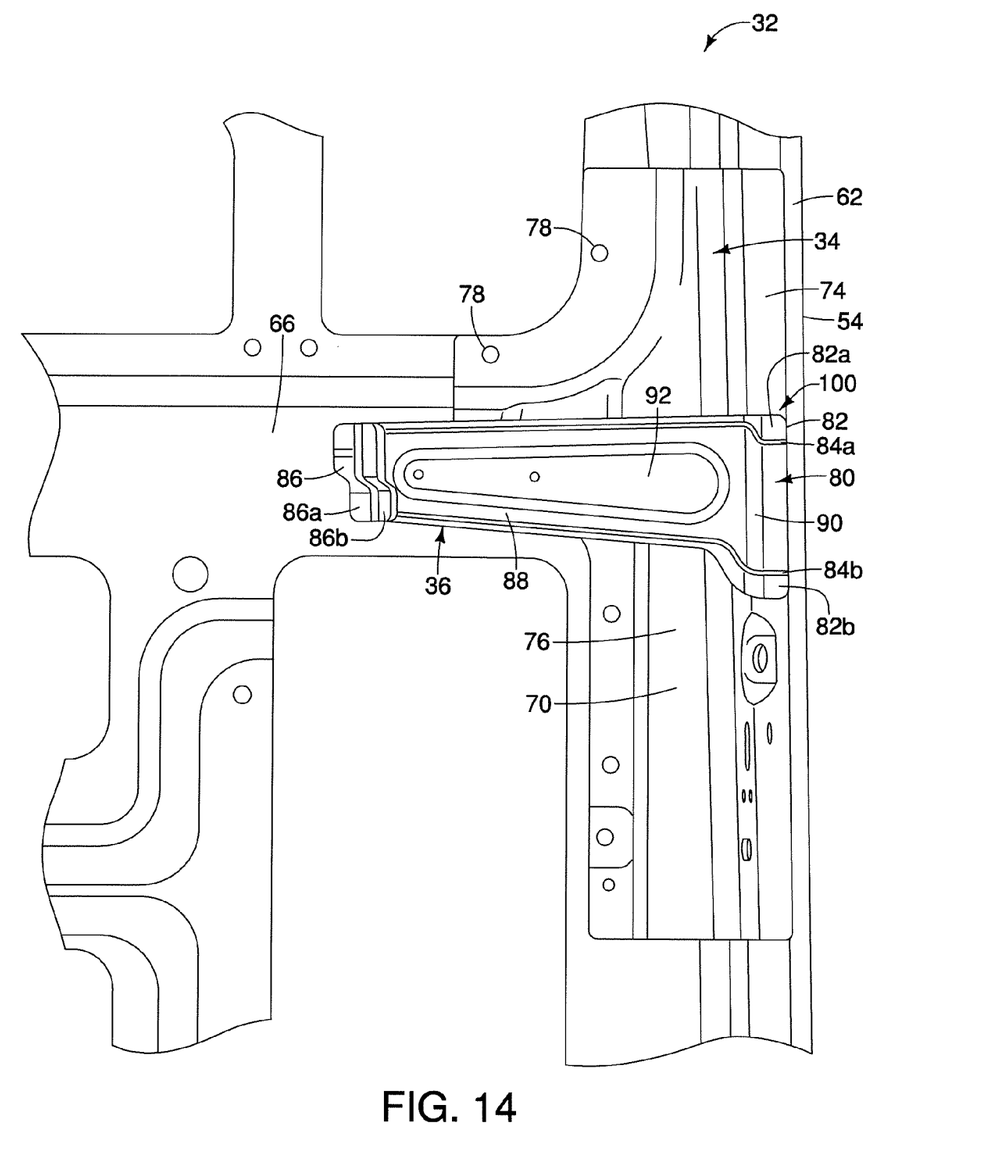
FIG. 14 is a detailed side elevational view of the reinforcement member mounted to the inner door reinforcement component and the inner vehicle door panel.
Figure 15:
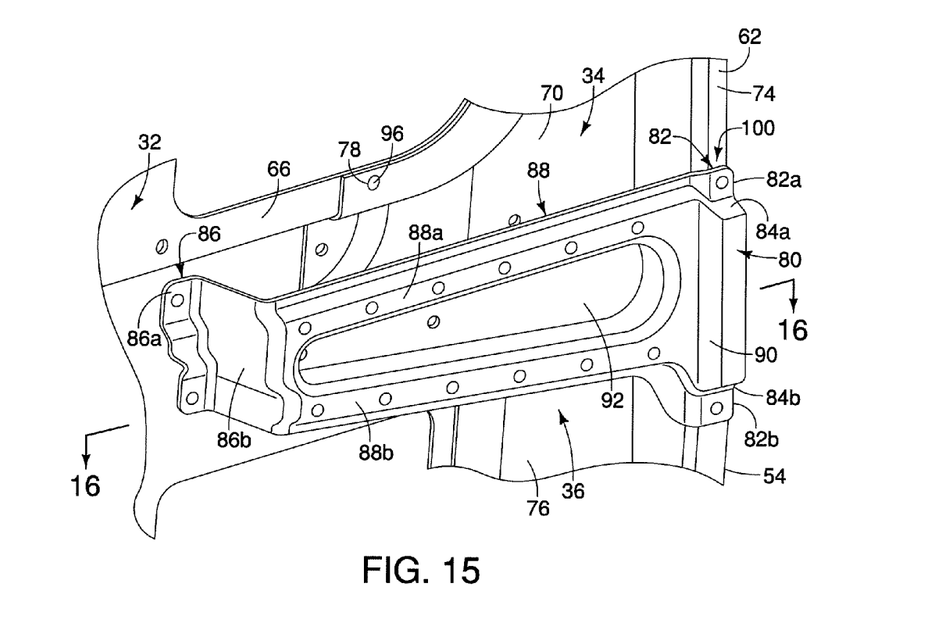
FIG. 15 is a detailed perspective view of the reinforcement member mounted to the inner door reinforcement component and the inner vehicle door panel.
Figure 16:
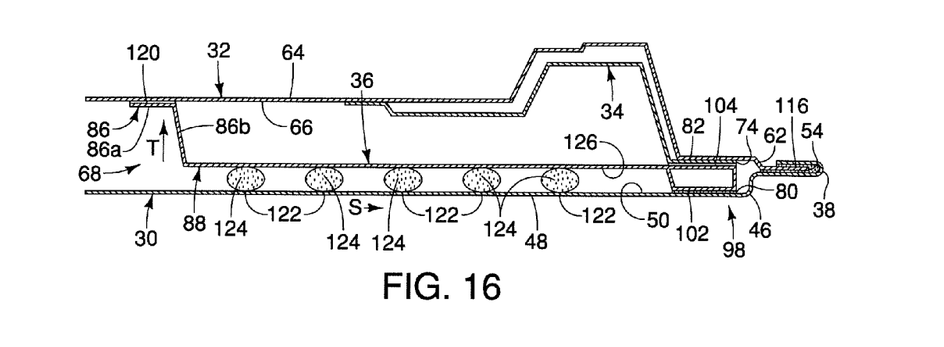
FIG. 16 is a cross-sectional view of the reinforcement member mounted to the inner door reinforcement component and the inner vehicle door panel as taken along lines 16-16 in FIG. 15 and modified to include the outer vehicle door panel.

As further shown in FIGS. 14-16, the third attachment portion 86 of the reinforcement member 36 is rigidly attached to the inner surface 66 of the inner door panel 32 by, for example, one or more welds 120 or any other suitable type of rigid fastener such as bolts, screws, rivets, adhesives and so on. Also, the stiffener 88 of the reinforcement member 36 is semi-rigidly attached at a plurality of stiffener attachment points 122 to the inner surface 50 of the outer door panel 30. In this example, the stiffener 88 is attached at the stiffener attachment points 122 to the inner surface 50 of the outer door panel 30 by a non-structural adhesive 124. The non-structural adhesive 124 can be a mastic adhesive or any other suitable type of low-stiffness, expandable adhesive that is placed at each of the stiffener attachment points 122 as indicated. The non-structural adhesive 124 thus spaces an inner surface 126 of the stiffener 88 that faces the inner surface 50 of the outer door panel 30 at a distance away from the inner surface 50 of the outer door panel 30.

The stiffener 88 thus reduces flexing, deformation and vibration of an area of the outer door panel 30 proximate to the door handle receiving portion 52 during opening and closing of the vehicle door 12 and during operation of the door handle 26. The stiffener 88 also improves mounting stiffness of the door handle receiving portion 52 and surrounding area of the outer door panel 30. Furthermore, as can be appreciated by one skilled in the art, the stiffener 88 in the reinforcement member 36 is configured to provide a tensile force travel path that transfers a tensile force generated in the reinforcement member 36 to the inner door panel 32 in a direction T during movement between the closed and open door positions as shown in FIGS. 2 and 3, respectively. Accordingly, the arrangement of the reinforcement member 36 including the stiffener 88 increases durability of the door 12 by increasing the panel stiffness, which can reduce the shear force or stress in the outer door panel that is imposed on the parting radius 108, and can also prevent or at least reduce the formation of fatigue cracks in the outer door panel near the hem flange 114 and near the door handle receiving portion 52 in the outer door panel 30.

Alternative approaches for reinforcing the outer door panel 30 include applying a specialized stiffener to the inner surface 50 of the outer door panel 30. The specialized stiffener can include, for example, a woven fiberglass layer having high flexibility. A thin adhesive layer can be used to attach the woven fiberglass layer to the inner surface 50 of the outer door panel 30. However, it can be difficult to conform the woven fiberglass layer to the small dimensioned parting radius 108. Also, the woven fiberglass layer may not necessarily sufficiently reduce cracking in the area of the outer door panel 30 near the door handle receiving portion 52.

Furthermore, the reinforcement member 36 can be configured without the third attachment portion 86, the stiffener portion 88 and the third extension portion 90. This type of arrangement could be used, for example, in an outer door panel 30 that is otherwise configured to eliminate or at least reduce the formation of cracks near the parting radius 106. Also, the outer door panel 30 can be configured with larger parting radius 108 to help to reduce stress in the outer door panel 30.

GENERAL INTERPRETATION OF TERMS

In understanding the scope of the present invention, the term "comprising" and its derivatives, as used herein, are intended to be open ended terms that specify the presence of the stated features, elements, components, groups, integers, and/or steps, but do not exclude the presence of other unstated features, elements, components, groups, integers and/or steps. The foregoing also applies to words having similar meanings such as the terms, "including", "having" and their derivatives. Also, the terms "part," "section," "portion," "member" or "element" when used in the singular can have the dual meaning of a single part or a plurality of parts. Also as used herein to describe the above embodiment(s), the following directional terms "forward", "rearward", "above", "downward", "vertical", "horizontal", "below" and "transverse" as well as any other similar directional terms refer to those directions of a vehicle equipped with the reinforcement member. Accordingly, these terms, as utilized to describe the present invention should be interpreted relative to a vehicle equipped with the reinforcement member.

The terms of degree such as "substantially", "about" and "approximately" as used herein mean a reasonable amount of deviation of the modified term such that the end result is not significantly changed.

While only selected embodiments have been chosen to illustrate the present invention, it will be apparent to those skilled in the art from this disclosure that various changes and modifications can be made herein without departing from the scope of the invention as defined in the appended claims. For example, the size, shape, location or orientation of the various components can be changed as needed and/or desired. Components that are shown directly connected or contacting each other can have intermediate structures disposed between them. The functions of one element can be performed by two, and vice versa. The structures and functions of one embodiment can be adopted in another embodiment. It is not necessary for all advantages to be present in a particular embodiment at the same time. Every feature which is unique from the prior art, alone or in combination with other features, also should be considered a separate description of further inventions by the applicant, including the structural and/or functional concepts embodied by such feature(s). Thus, the foregoing descriptions of the embodiments according to the present invention are provided for illustration only, and not for the purpose of limiting the invention as defined by the appended claims and their equivalents.

What is claimed is:

1. A vehicle door comprising:
an outer door panel having a pair of vertically extending outer door panel free ends and a pair of horizontally extending outer door panel free ends forming an outer door panel peripheral edge portion;
an inner door panel having a pair of vertically extending inner door panel free ends and a pair of horizontally extending inner door panel free ends forming an inner door panel peripheral edge portion, the vertically extending outer door panel free ends being rigidly attached to the vertically extending inner door panel free ends and the horizontally extending outer door panel free ends being rigidly attached to the horizontally extending inner door panel free ends such that the outer door panel peripheral edge portion and the inner door panel peripheral edge portion define a peripheral edge portion of the vehicle door and an internal door cavity is defined between the outer and inner door panels; and
a reinforcement member disposed in the internal door cavity, the reinforcement member including a first attachment portion rigidly attached to an inner surface of the outer door panel at a first location adjacent the peripheral edge portion of the outer door panel, and a second attachment portion rigidly attached to an inner surface of the inner door panel at a second location.

2. The vehicle door according to claim 1, wherein
the second location is proximate to the peripheral edge portion of the outer door panel to which the first location is adjacent.

3. The vehicle door according to claim 1, further comprising
a sliding door support configured to be slidably coupled to a vehicle such that the inner and outer panels move in unison between a closed position and an open position; and
the reinforcement member is configured to provide a load transfer path that transfers a shear load generated in the outer panel to the inner panel during movement between the closed and open positions.

4. The vehicle door according to claim 3, wherein
the peripheral edge portion of the outer door panel includes a curved section that curves along a parting radius and a step leg that extends from the curved section toward the inner surface of the inner door panel; and
the reinforcement member is configured between the inner and outer door panels in an arrangement that provides the load transfer path in a direction that is substantially parallel to the step leg.

5. The vehicle door according to claim 3, wherein
the reinforcement member is configured between the inner and outer door panels in an arrangement that provides the load transfer path in a direction that is substantially perpendicular to a direction of a shear force along which the shear load is generated in the outer door panel during movement of the vehicle door to the closed position.

6. The vehicle door according to claim 1, wherein the first attachment portion extends substantially parallel to the inner surface of the outer door panel.

7. The vehicle door according to claim 1, wherein the reinforcement member further includes an extension portion that extends between the first and second attachment portions.

8. The vehicle door according to claim 7, wherein the first and second attachment portions extend transverse to the extension portion.

9. The vehicle door according to claim 1, wherein the first and second attachment portions extend substantially parallel to each other.

10. The vehicle door according to claim 1, wherein the second attachment portion includes first and second attachment sections that are located at opposite ends of the first attachment portion with respect to an adjacent section of the peripheral edge portion of the outer door panel.

11. The vehicle door according to claim 10, wherein the reinforcement member further includes a first extension portion that couples the first attachment section to the first attachment portion and a second extension portion that couples the second attachment section to the first attachment portion, the first and second extension portions extending in a direction between the inner surface of the outer door panel and the inner surface of the inner door panel.

12. A vehicle door comprising:
an outer door panel having a pair of vertically extending free ends and a pair of horizontally extending free ends forming a peripheral edge portion;
an inner door panel rigidly attached to the peripheral edge portion of the outer door panel such that an internal door cavity is defined between the outer and inner door panels; and
a reinforcement member disposed in the internal door cavity, the reinforcement member including a first attachment portion rigidly attached to an inner surface of the outer door panel at a first location adjacent the peripheral edge portion of the outer door panel, and a second attachment portion rigidly attached to an inner surface of the inner door panel at a second location, the second attachment portion including first and second attachment sections that are located at opposite ends of the first attachment portion with respect to an adjacent section of the peripheral edge portion of the outer door panel, the reinforcement member further including
 a first extension portion that couples the first attachment section to the first attachment portion;
 a second extension portion that couples the second attachment section to the first attachment portion, the first and second extension portions extending in a direction between the inner surface of the outer door panel and the inner surface of the inner door panel, and
 a third attachment portion rigidly attached to the inner surface of the inner door panel, a stiffener portion extending from the third attachment portion toward the first attachment portion, and a third extension portion coupling the stiffener portion and the first attachment portion.

13. The vehicle door according to claim 12, wherein the stiffener portion is attached to the inner surface of the outer door panel by non-structural adhesive.

14. The vehicle door according to claim 1, wherein the second attachment portion extends substantially parallel to the inner surface of the inner door panel.

15. The vehicle door according to claim 1, wherein the first attachment portion of the reinforcement member is attached to the inner surface of the outer door panel by non-welded structural adhesive that provides a rigid connection therebetween.

16. The vehicle door according to claim 15, wherein the non-welded structural adhesive includes a bake out adhesive tape.

17. The vehicle door according to claim 1, wherein the second attachment portion of the reinforcement member is attached to the inner surface of the inner door panel by at least one weld.

18. The vehicle door according to claim 1, wherein the outer door panel defines a door handle receiving portion, and the first attachment portion is positioned horizontally along the outer door panel between the peripheral edge portion and the door handle receiving portion.

19. The vehicle door according to claim 1, wherein the reinforcement member is disposed to extend along the peripheral edge portion of the outer door panel.

20. The vehicle door according to claim 1, wherein the first attachment portion extends along a section of the peripheral edge portion defined by one of the vertically extending free edges of the outer door panel.

21. The vehicle door according to claim 1, wherein the peripheral edge portion of the outer door panel includes a curved section that curves along a parting radius and a step leg that extends from the curved section toward the inner surface of the inner door panel; and
the first location is adjacent to the curved section.

22. The vehicle door according to claim 1, wherein the reinforcement member is configured to provide a load transfer path that transfers a shear load generated in the outer panel to the inner panel during movement.

23. The vehicle door according to claim 1, wherein the inner door panel is attached along and about the peripheral edge portion of the outer door panel;
the inner door panel further includes an outer surface that is on a side opposite to the inner surface of the inner door panel and faces inwardly of a vehicle; and
the inner surface of the inner door panel and the inner surface of the outer door panel face each other to define the internal door cavity.

24. The vehicle door according to claim 23, wherein the inner door panel is attached along and about the peripheral edge portion of the outer door panel such that the inner door panel spans a horizontal distance between the pair of vertically extending free ends of the outer door panel and spans a vertical distance between the pair of horizontally extending free ends of the outer door panel.

25. A vehicle door comprising:
an outer door panel having a pair of vertically extending free ends and a pair of horizontally extending free ends forming a peripheral edge portion, and the outer door panel defining a door handle receiving portion positioned closer to a first one of the vertically extending free ends than a second one of the vertically extending free ends;
an inner door panel rigidly attached to the peripheral edge portion of the outer door panel such that an internal door cavity is defined between the outer and inner door panels; and
a reinforcement member disposed in the internal door cavity, the reinforcement member including a first attachment portion rigidly attached to an inner surface of the outer door panel at a first location that is positioned horizontally along the outer door panel between the first one of the vertically extending free ends of the outer door panel and the door handle receiving portion, and a second attachment portion rigidly attached to an inner surface of the inner door panel at a second location.

26. The vehicle door according to claim 25, further comprising
a sliding door support configured to be slidably coupled to a vehicle such that the inner and outer panels move in unison between a closed position and an open position; and
the reinforcement member is configured to provide a load transfer path that transfers a shear load generated in the outer panel to the inner panel during movement between the closed and open positions, the load transfer path being positioned between the first one of the vertically extending free ends of the outer door panel and the door handle receiving portion.

27. A vehicle door comprising:
an outer door panel having a pair of vertically extending free ends and a pair of horizontally extending free ends forming a peripheral edge portion;
an inner door panel rigidly attached to the peripheral edge portion of the outer door panel such that an internal door cavity is defined between the outer and inner door panels, the outer and inner door panels being spaced at a first distance adjacent the peripheral edge portion and being spaced at a second distance at a location away from the peripheral edge, the second distance being different than the first distance; and
a reinforcement member disposed in the internal door cavity, the reinforcement member including a first attachment portion rigidly attached to an inner surface of the outer door panel at a first location adjacent the peripheral edge portion of the outer door panel, and a second attachment portion rigidly attached to an inner surface of the inner door panel at a second location, such that the reinforcement member spans the first distance.

* * * * *